United States Patent
Kirkpatrick (10) Patent No.: US 9,482,299 B1
(45) Date of Patent: Nov. 1, 2016

(54) MULTI-LEAVED CORE BRAKE DISKS AND ASSEMBLIES

(71) Applicant: Goodrich Corporation, Charlotte, NC (US)

(72) Inventor: Christopher T. Kirkpatrick, Pueblo West, CO (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/795,798

(22) Filed: Jul. 9, 2015

(51) Int. Cl.
*F16D 65/12* (2006.01)
*F16D 55/24* (2006.01)
*F16D 65/02* (2006.01)

(52) U.S. Cl.
CPC ............... *F16D 65/12* (2013.01); *F16D 55/24* (2013.01); *F16D 2065/132* (2013.01)

(58) Field of Classification Search
CPC .... B60T 1/065; F16D 65/0006; F16D 65/12; F16D 55/36; F16D 55/24; F16D 2065/0058; F16D 2065/132; F16D 2065/1328
See application file for complete search history.

(56) References Cited

U.S. PATENT DOCUMENTS

| | | | |
|---|---|---|---|
| 4,585,096 A | 4/1986 | Bok | |
| 5,143,184 A | 9/1992 | Snyder et al. | |
| 5,255,761 A | 10/1993 | Zaremsky | |
| 5,779,006 A | 7/1998 | Hyde et al. | |
| 7,153,543 B2 | 12/2006 | Johnson | |
| 8,978,843 B2 | 3/2015 | Kirkpatrick et al. | |
| 9,366,302 B1* | 6/2016 | Kirkpatrick | F16D 65/12 |
| 2010/0000070 A1* | 1/2010 | La Forest | C04B 35/83 29/525.06 |
| 2010/0090059 A1* | 4/2010 | Johnson | F16D 65/12 244/111 |
| 2012/0118685 A1 | 5/2012 | Johnson et al. | |
| 2014/0174863 A1* | 6/2014 | Kirkpatrick | F16D 55/36 188/218 XL |
| 2015/0001008 A1* | 1/2015 | Kirkpatrick | B64C 25/42 188/71.5 |
| 2015/0129369 A1 | 5/2015 | Kirkpatrick | |

* cited by examiner

*Primary Examiner* — Vishal Sahni
(74) *Attorney, Agent, or Firm* — Snell & Wilmer, L.L.P.

(57) ABSTRACT

The present disclosure provides a multi-leaved core damping disk comprising an annular-shaped first disk half, an annular shaped second disk half, and a multi-leaved core axially aligned with, and disposed therebetween.

17 Claims, 7 Drawing Sheets

MULTI-LEAVED CORE BRAKE DISKS AND ASSEMBLIES

FIELD

The present disclosure relates to aircraft braking systems and, more particularly, to a vibration damping brake disk of an aircraft brake assembly.

BACKGROUND

Aircraft brake systems typically employ a series of friction disks that, when forced into contact with each other, help to stop the aircraft. Friction disks splined to a non-rotating wheel axle are interspersed with friction disks splined to the rotating wheel. The friction disks are configured to withstand and dissipate the heat generated from contact between the friction disks during braking. Due to high speed landings and rejected takeoffs, over time, the amount of heat generated can be enough to destroy friction disks made of formerly commonly used materials, such as steel. Carbon composite materials are better suited for high temperature use and are now the standard for friction disks in aircraft brake assemblies. However, carbon composite disks may vibrate in use and may generate significant brake noise.

SUMMARY

In various embodiments, the present disclosure provides a multi-leaved core damping disk comprising a first disk half, a second disk half, and a multi-leaved core axially aligned with, and disposed therebetween. In various embodiments, the first disk half comprises a first friction surface at a first axial end of the first disk half and a first non-friction surface at a second axial end of the first disk half, and the second disk half comprises a second friction surface at a third axial end of the second disk half and a second non-friction surface at a fourth axial end of the second disk half. In various embodiments, the first friction surface is disposed at a fifth axial end of the multi-leaved core damping disk and the second friction surface is disposed at a sixth axial end of the multi-leaved core damping disk.

In various embodiments, the multi-leaved core comprises a plurality of disk leaves. In various embodiments, the plurality of disk leaves comprise a carbon composite material. In various embodiments, the plurality of disk leaves comprise a refractory metal. In various embodiments, at least one of the plurality of disk leaves comprises an axial thickness of between about 1.27 millimeters (about 0.05 inches) and about 15.24 millimeters (about 0.6 inches). In various embodiments, the multi-leaved core further comprises a plurality of spacers, wherein each one of the plurality of spacers is disposed alternately with each one of the plurality of disk leaves along an axis. In various embodiments, at least one of the plurality of disk leaves comprises a contact surface at an axial end of the at least one of the plurality of disk leaves, and a non-contact surface recessed from the contact surface. In various embodiments, the multi-leaved core further comprises a floating core.

In various embodiments, the present disclosure provides a disk brake assembly comprising a pressure plate coupled to a first rotor friction disk of a plurality of rotor friction disks, and a plurality of stator friction disks located between the pressure plate and an end plate, wherein each one of the plurality of stator friction disks is disposed alternately with each one of the plurality of rotor friction disks along an axis, and wherein at least one of the plurality of rotor friction disks and the plurality of stator friction disks comprises a solid friction disk. In various embodiments, the end plate is coupled to a second rotor friction disk of the plurality of rotor friction disks, and at least one stator friction disk comprises a multi-leaved core damping disk. In various embodiments, the end plate is coupled to a second rotor friction disk of the plurality of rotor friction disks, and at least one rotor friction disk comprises a multi-leaved core damping disk.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, devices and systems may find particular use in connection with aircraft brake disks. However, various aspects of the disclosed embodiments may be adapted for optimized performance with a variety of brake disks and/or disk brake assemblies. As such, numerous applications of the present disclosure may be realized.

In various embodiments, multi-leaved core damping disks comprising a multi-leaved core are disclosed. In various embodiments, the multi-leaved core damping disk may comprise friction disks, including rotors and/or stators. In various embodiments, the multi-leaved core damping disk may comprise a first disk half and a second disk half, and a multi-leaved core disposed axially therebetween. In various embodiments, first disk half, second disk half, and/or multi-leaved core may comprise a generally annular shape. However, in various embodiments, first disk half, second disk half, and/or multi-leaved core may comprise any suitable shape.

In various embodiments, the first disk half may comprise a first friction surface located at a first axial end and a first non-friction surface located at a second axial end. In various embodiments, first axial end and second axial end may comprise opposite axial ends of the first disk half. In various embodiments, the second disk half may comprise a second friction surface located at a third axial end and a second non-friction surface located at a fourth axial end. In various embodiments, third axial end and fourth axial end may comprise opposite axial ends of the second disk half. In various embodiments, the first friction surface and the second friction surface may be disposed at opposite axial ends of the multi-leaved core damping disk. Stated differently, first friction surface may be disposed at a fifth axial end of the multi-leaved core damping disk and second friction surface may be disposed at a sixth axial end of the multi-leaved core damping disk.

In various embodiments, the multi-leaved core may comprise a plurality of thin disk leaves configured to damp noise and vibration generated from contact between friction disks during braking. In various embodiments, each disk leaves may comprise a generally annular shape. However, in various embodiments, disk leaves may comprise any suitable shape. In various embodiments, each one of the plurality of disk leaves may comprise non-friction surfaces at opposite axial ends of the disk leaves. In various embodiments, non-friction surfaces of the disk leaves may physically contact other portions of the multi-leaved core damping disk, but may not form a continuous structure. While not intending to be bound by theory, this structural discontinuity may serve to damp vibration.

In various embodiments, disk brake assemblies comprising a combination of multi-leaved core damping disks and solid friction disks are disclosed. These multi-leaved core damping disks and/or solid frictions disks may be arranged together in any suitable pattern or position. In various embodiments, a disk brake assembly may comprise a single, "dead" disk configured to damp vibration and noise, and a plurality of solid friction disks.

Figure 1:
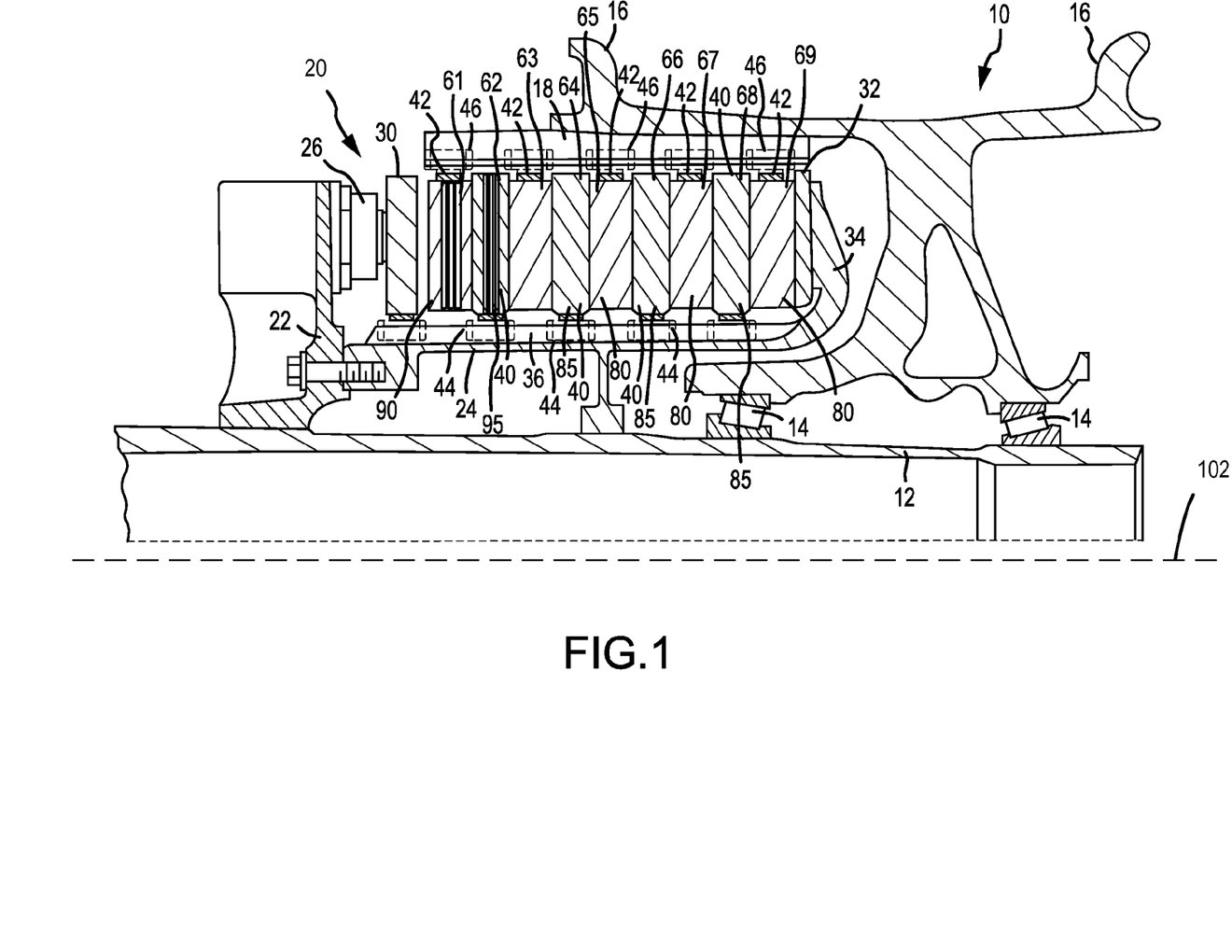
FIG. 1 illustrates a partial cross-sectional view of a disk brake assembly in accordance with various embodiments.

According to various embodiments, and with reference to FIG. 1, a cross-sectional view of wheel 10 supported for rotation around axle 12 by bearings 14 is depicted. In various embodiments, wheel 10 includes rims 16 for supporting a tire and a series of axially extending rotor splines 18 (one shown). In various embodiments, rotation of wheel 10 is modulated by disk brake assembly 20. In various embodiments, disk brake assembly 20 includes torque flange 22, torque tube 24, a plurality of pistons 26 (one shown), pressure carbon disk 30, and end plate 32. In various embodiments, torque tube 24 is an elongated annular structure that includes reaction plate 34 and a series of axially extending stator splines 36 (one shown). In various embodiment, reaction plate 34 and stator splines 36 may be integral with torque tube 24 as shown in FIG. 1, or attached as separate components.

In various embodiments, disk brake assembly 20 also includes at least one multi-leaved core damping disk and at least one solid friction disk (and/or solid friction disk assembly). In various embodiments, multi-leaved core damping disks 90, 95 may be a non-rotatable friction disk 40, or a rotatable friction disk 42. In various embodiments, solid friction disks 80, 85 may be a non-rotatable friction disk 40, or a rotatable friction disk 42. In various embodiments, solid friction disks 80, 85 may comprise a continuous or unitary annular-shaped disk. As used herein, a non-rotatable friction disk 40 (such as disks 85, 95) may be referred to as a stator friction disk. At times a rotatable friction disk 42 (such as disks 80, 90) may be referred to as a rotor friction disk. In various embodiments, each one of multi-leaved core damping disks 90, 95 and/or solid friction disks 80, 85 includes an attachment structure. In various embodiments, non-rotatable friction disk 40 may include a plurality of stator lugs 44 at circumferentially spaced positions around non-rotatable friction disk 40 as an attachment structure. Similarly, in various embodiments, rotatable friction disk 42 may include a plurality of rotor lugs 46 at circumferentially spaced positions around rotatable friction disk 42 at an attachment structure. The disk brake assemblies contemplated herein may have any number of rotatable friction disks and/or non-rotatable friction disks, such as 5,4; 4,3; and 3,2, respectively. For convenience, the friction disk positions referred to herein are labeled 61, 62, 63, 64, 65, 66, 67, 68, and 69 from the pressure carbon disk 30 to the end plate 32. For instance, position 61 is adjacent to the pressure carbon disk 30 while position 69 is adjacent to the end plate 32. In various embodiments, pressure carbon disk 30, end plate 32, solid friction disks 80, 85 and multi-leaved core damping disks 90, 95 are all generally annular structures comprising a carbon composite material.

In various embodiments, torque flange 22 is mounted to axle 12. In various embodiments, torque tube 24 is bolted to torque flange 22 such that reaction plate 34 is near an axial center of wheel 10. In various embodiments, end plate 32 is connected to a surface of reaction plate 34 facing axially towards pressure carbon disk 30. Thus, in various embodiments, end plate 32 is non-rotatable by virtue of its connection to torque tube 24. In various embodiments, stator splines 36 support pressure carbon disk 30 so that pressure carbon disk 30 is also non-rotatable. In various embodiments, stator splines 36 also support non-rotatable friction disks 40. In various embodiments, non-rotatable friction disks 40 engage stator splines 36 with gaps formed between stator lugs 44. Similarly, in various embodiments, rotatable friction disks 42 engage rotor splines 18 with gaps formed between rotor lugs 46. Thus, in various embodiments, rotatable friction disks 42 are rotatable by virtue of their engagement with rotor splines 18 of wheel 10.

As shown in FIG. 1, in various embodiments, rotatable friction disks 42 are arranged with end plate 32 on one end, pressure carbon disk 30 on the other end, and non-rotatable friction disks 40 interleaved so that rotatable friction disks 42 are adjacent to non-rotatable friction components. In various embodiments, pistons 26 are connected to torque flange 22 at circumferentially spaced positions around torque flange 22. In various embodiments, pistons 26 face axially toward wheel 10 and contact a side of pressure carbon disk 30 opposite rotatable friction disks 42. In various embodiments, pistons 26 may be powered electrically, hydraulically, pneumatically and/or combinations thereof.

Figure 2:
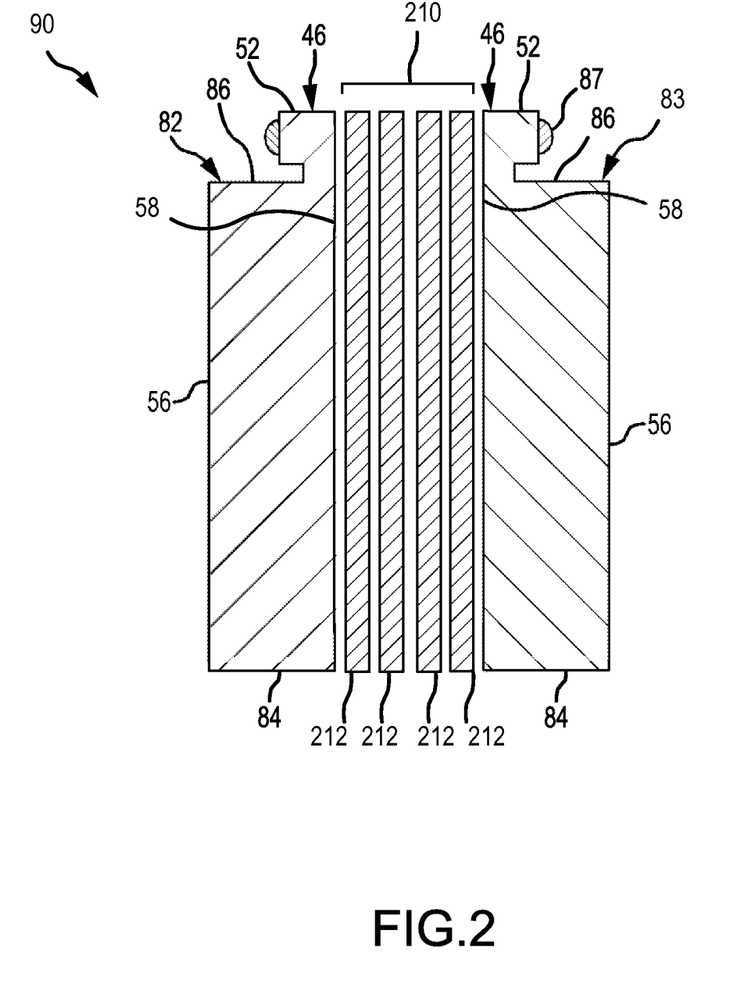
FIG. 2 illustrates a partial cross-sectional view of a multi-leaved core damping disk in accordance with various embodiments.

With reference to FIG. 2, a cross-sectional view of multi-leaved core damping disk 90, which is a rotatable friction disk 42, is depicted. In various embodiments, multi-leaved core damping disk 90 comprises a first disk half 82 and a second disk half 83. In various embodiments, first disk half 82 and second disk half 83 may comprise annular-shaped disks. In various embodiments, first disk half 82 and second disk half 83 may comprise an attachment structure in the form of rotor lug 46, friction surface 56, and non-friction surface 58. In various embodiments, friction surface 56 may be disposed at an axial end of first disk half 82 and second disk half 83. In various embodiments, friction surface 56 may be configured for operationally engaging a corresponding friction surface of another disk brake assembly component, such as a non-rotatable friction disk 40. In various embodiments, non-friction surface 58 may be located at an axial end of first disk half 82 and second disk half 83 on a side opposite of friction surface 56. In various embodiments, non-friction surface 58 may be configured for contacting a non-friction surface of another disk brake assembly component.

In various embodiments, first disk half 82 and second disk half 83 further comprise inner diameter surface 84 and outer diameter surface 86 and outer attachment surface 52. In various embodiments, inner diameter surface 84 may be located at a radially inward facing edge of first disk half 82 and second disk half 83. In various embodiments, outer diameter surface 86 and outer attachment surface 52 may be located at a radially outward facing edge of first disk half 82 and second disk half 83. In various embodiments, friction surface 56 may extend radially between inner diameter surface 84 and outer diameter surface 86. In various embodiments, non-friction surface 58 may extend radially between inner diameter surface 84 and outer attachment surface 52.

In various embodiments, first disk half 82 and second disk half 83 may comprise an attachment structure in the form of rotor lug 46. In various embodiments, rotor lug 46 may project radially outward from outer diameter surface 86. As shown in FIG. 2, in various embodiments, multi-leaved core 210 may be disposed between first disk half 82 and second disk half 83 such that their respective non-friction surfaces 58 are in contact with multi-leaved core 210 to form multi-leaved core damping disk 90. In various embodiments, multi-leaved core 210 may comprise a plurality of disk leaves 212.

In various embodiments, first disk half 82 and second disk half 83 may be coupled by a fastening device 87. In various embodiments, fastening device 87 may comprise a rivet, spring-loaded rivet, clamp, or other assembly hardware. However, in various embodiments, fastening device 87 may comprise any attachment mechanism suitable for use in multi-leaved core damping disk 90. In various embodiments, while the first disk half 82 and second disk half 83 may be held in contact with multi-leaved core 210, they may form a non-continuous structure. That is, the non-friction surfaces 58 are not bonded to multi-leaved core 210, but are merely held together by, for example, fastening device 87. In various embodiments, first disk half 82 and second disk half 83 may be coupled by a plurality of fastening devices disposed circumferentially about multi-leaved core damping disk.

In various embodiments, disk leaves 212 may comprise thin, generally annular-shaped disks. In various embodiments, disk leaves 212 may be oriented about axis 102 (with momentary reference to FIG. 1) and disposed substantially parallel to first disk half 82 and second disk half 83. As shown in FIG. 2, in various embodiments, multi-leaved core 210 may comprise four disk leaves 212. However, a multi-leaved core may comprise any number of disk leaves suitable for a particular embodiment. In various embodiments, disk leaf 212 may comprise an axial thickness of between about 1.27 millimeters (about 0.05 inches) and about 15.24 millimeters (about 0.6 inches), wherein the term about in this context only refers to +/−0.635 millimeters (about 0.025 inches). However, in various embodiments, disk leaf 212 may comprise any suitable axial thickness.

In various embodiments, disk leaves 212 may comprise at least one of a carbon composite material, a refractory metal, or a refractory metal alloy. For example, in various embodiments, disk leaves 212 may comprise at least one of carbon, silicon carbide, silicon nitride, boron carbide, aluminum nitride, titanium nitride, boron nitride, zirconia, $SiC_xN_y$ (wherein x is a number in the range from about zero to about 1, and y is a number in the range from about zero to about 4/3), silica, alumina, titania ($TiO_2$), or a combination of at least two of the foregoing. However, in various embodiments, disk leaves 212 may comprise any suitable material capable of withstanding operational temperatures of a disk brake assembly.

Although the embodiment of FIG. 2 is described in terms of multi-leaved core damping disk 90, which is a rotatable friction disk 42 (with momentary reference to FIG. 1), it is understood that the same description and features apply generally to either type of multi-leaved core damping disk 90, 95 and thus, to a non-rotatable friction disk 40 (with momentary reference to FIG. 1), except that rotor lug 46 at outer diameter surface 86 is replaced by stator lug 44 at inner diameter surface 84.

With reference to FIGS. 1 and 2, in various embodiments, prior to operation of disk brake assembly 20, pistons 26 are not actuated and gaps exist between each of rotatable friction disks 42 and each of the non-rotatable friction components, namely pressure carbon disk 30, end plate 32, and non-rotatable friction disks 40. In various embodiments, the gaps are formed by the axial spreading of the rotatable friction disks 42 along rotor splines 18; and the non-rotatable friction disks 40, and pressure carbon disk 30 along stator splines 36 due to the movement of rotatable friction disks 42 adjacent to the non-rotatable friction components. In various embodiments, during operation of disk brake assembly 20, pistons 26 are actuated, forcing pressure carbon disk 30 to move along stator splines 36 against at least one of a plurality of multi-leaved core damping disks 90 and/or solid friction disks 80, forcing them axially toward end plate 32 and reaction plate 34. In various embodiments, squeezed between pressure carbon disk 30 and reaction plate 34, the gaps are eliminated as friction surfaces contact other, mating friction surfaces. In various embodiments, drag generated by the contact of the friction surfaces acts to slow rotatable friction disks 42 and wheel 10. In various embodiments, the drag also generates significant heat which is absorbed by multi-leaved core damping disks 90, 95 and/or solid friction disks 80, 85 of disk brake assembly 20.

In various embodiments, brake vibration is significantly damped by multi-leaved core damping disks 90, 95. In various embodiments, multi-leaved core damping disks 90, 95 are assembled such that non-friction surfaces therein are in physical contact, but do not form a continuous structure. Thus, in various embodiments, vibration is damped at non-friction surfaces, even though brake pressure is satisfactorily transmitted to and from all multi-leaved core damping disks 90, 95. Without wishing to be bound by theory, it is believed that the non-continuous structure of multi-leaved core damping disks causes increased absorption of vibrational energy.

In various embodiments, performance variation of the brake assembly/heat sink may be controlled through placement of one or more multi-leaved core damping disks 90, 95 in various locations within the brake assembly/heat sink. For instance, and with reference to FIG. 1, in various embodiments, one multi-leaved core damping disk may be disposed at any one of friction disk position 61, 62, 63, 64, 65, 66, 67, 68, or 69. In such an embodiment, the single multi-leaved core damping disk may be referred to as a "dead" disk and may provide damping for an entire disk brake assembly. In various embodiments, however, a multi-leaved core damping disk may be disposed at two or more of friction disk positions 61, 62, 63, 64, 65, 66, 67, 68, and/or 69.

Figure 3:
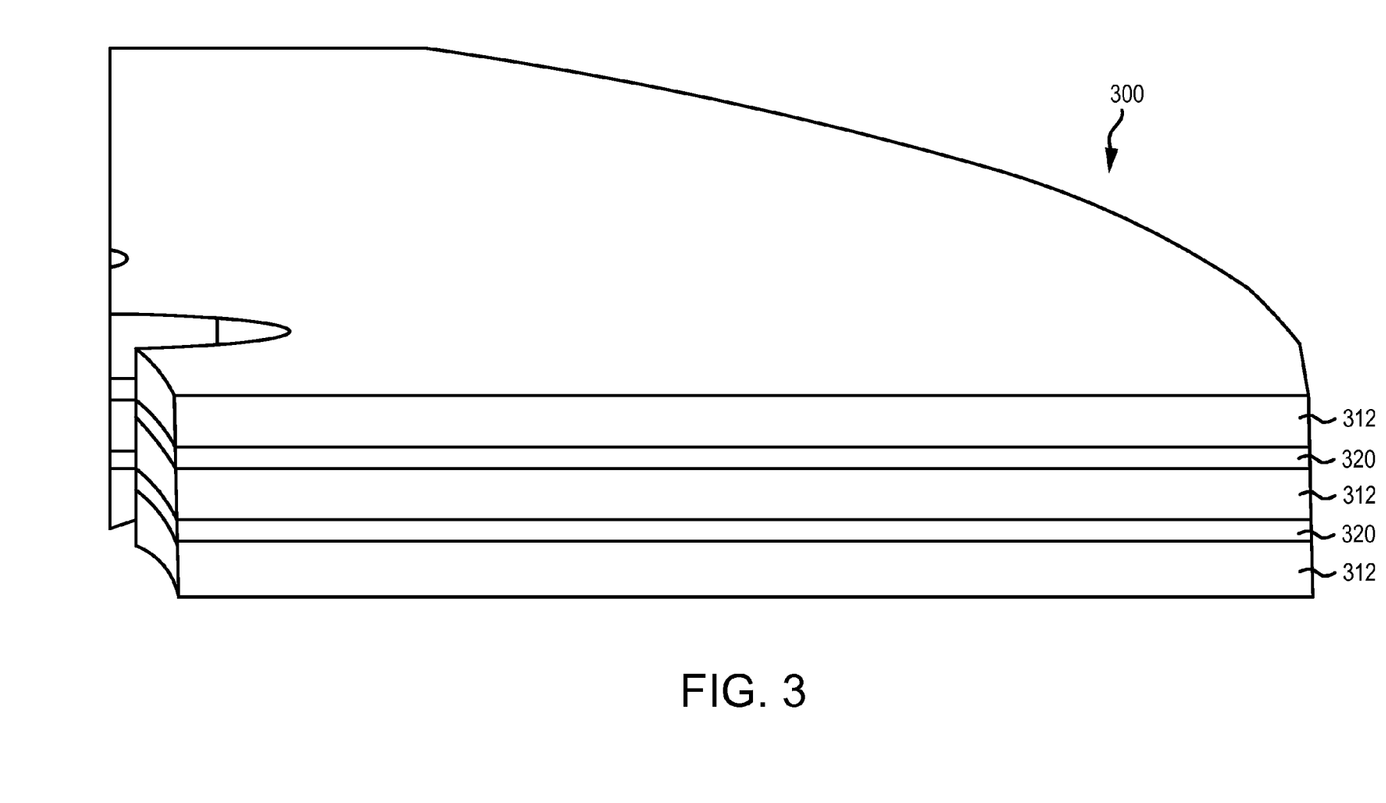
FIG. 3 illustrates a partial cut-away perspective view of a multi-leaved core in accordance with various embodiments.

In various embodiments a multi-leaved core damping disk may provide damping through additional features. With reference to FIG. 3, a multi-leaved core 300 may comprise a plurality of disk leaves 312. In various embodiments, multi-leaved core 300 may further comprise at least one spacer 320 interleaved between the plurality of disk leaves 312. In various embodiments, spacer 320 may comprise a carbon composite and/or carbon fiber-reinforced carbon, a composite material consisting of carbon fiber reinforcement in a matrix of graphite. In various embodiments, spacer 320 may comprise a refractory metal. In various embodiments, spacer 320 may comprise a different material than the plurality of disk leaves 312 and/or may comprise the same material as the plurality of disk leaves 312. In various embodiments, spacer 320 may provide additional damping.

Figure 4:
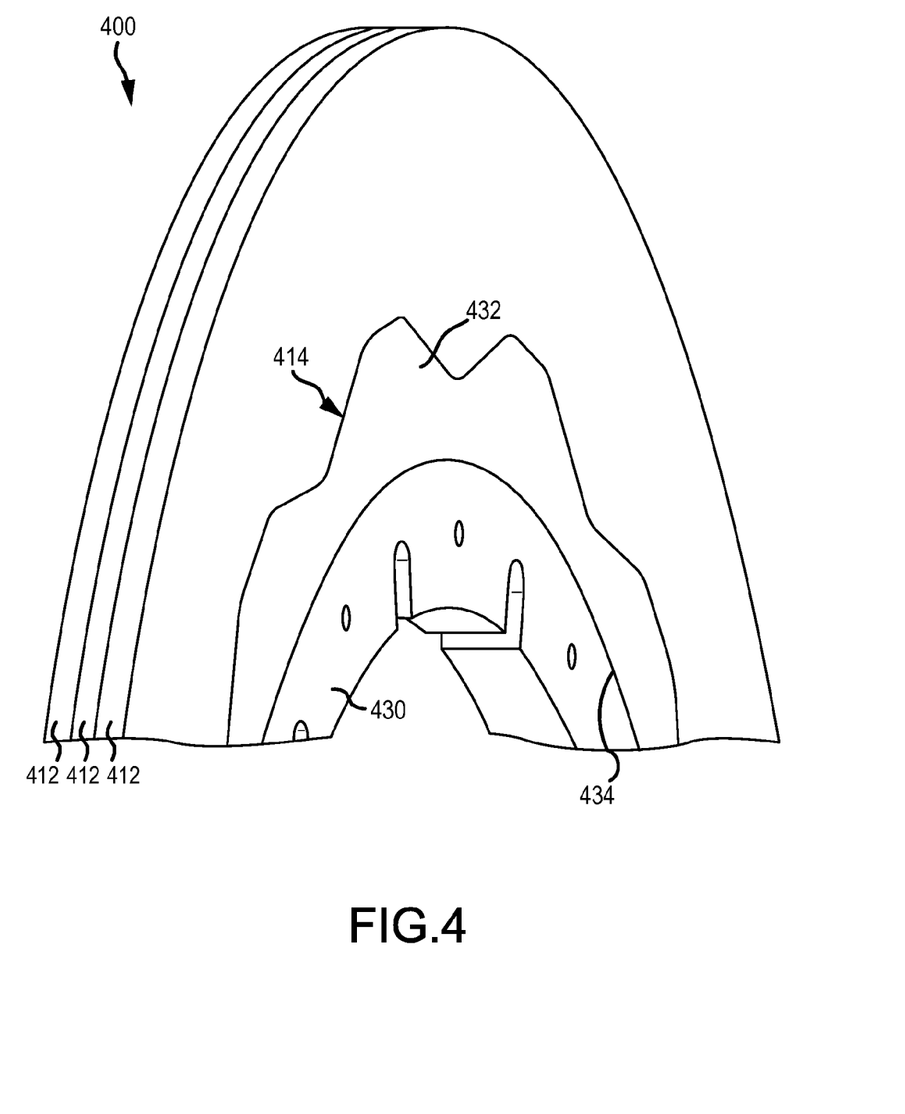
FIG. 4 illustrates a partial perspective view of a multi-leaved core in accordance with various embodiments.

In various embodiments, and with reference to FIG. 4, a multi-leaved core 400 may comprise a plurality of disk leaves 412 and a floating core 430. In various embodiments, floating core 430 may be located radially inward of disk leaves 412. In various embodiments, floating core 430 may comprise an annular component having floating core keys 432 extending radially outward from an outer circumference 434 of floating core 430. In various embodiments, each floating core key 432 may correspond to a plurality of disk leaf notches 414. In various embodiments, floating core 430 may be positioned such that floating core keys 432 fit within the plurality of disk leaf notches 414. Thus, in various embodiments, floating core keys 432 may contact lateral walls of the plurality of disk leaf notches 414 and prevent relative rotational movement between floating core 430 and the plurality of disk leaves 412. In various embodiments, a material of floating core 430 may be selected for its frictional and/or vibrational damping properties. In various embodiments, the material of floating core 430 may be selected for its wear resistance, thermal conductivity, heat capacity, structural, and/or oxidation resistance properties. In various embodiments, floating core 430 may comprise a carbon composite. In various embodiments, floating core 430 may provide additional damping.

Figure 5:
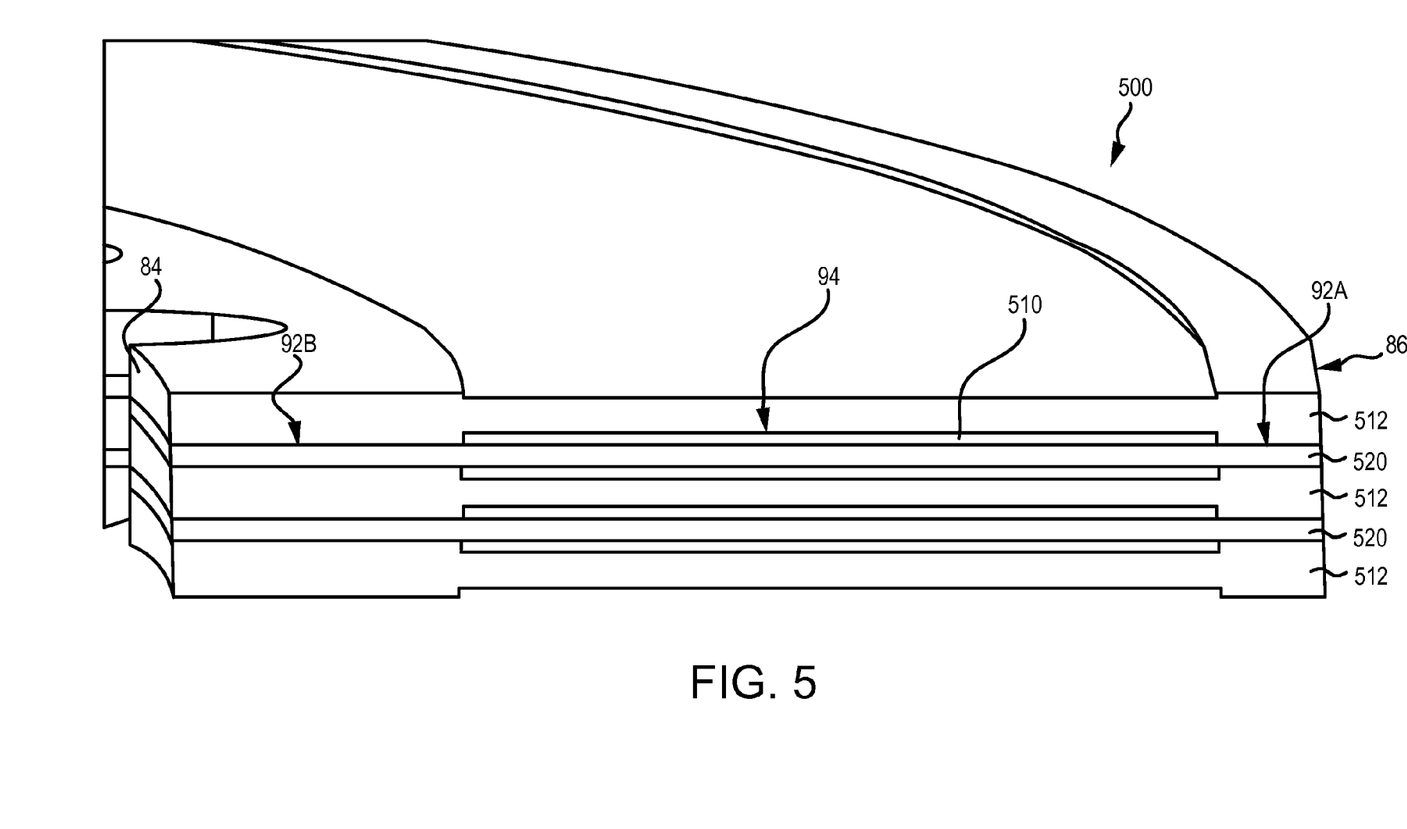
FIG. 5 illustrates a partial cut-away perspective view of a multi-leaved core in accordance with various embodiments.

In various embodiments, and with reference to FIG. 5, a multi-leaved core 500 may comprise at least one cavity 510 configured to provide additional damping. In various embodiments, at least one disk leaf 512 of multi-leaved core 500 may comprise at least one contact surface 92A, 92B and non-contact surface 94. In various embodiments, non-contact surface 94 may be recessed from contact surface 92A, and/or 92B. In various embodiments, contact surface 92B is substantially parallel to non-contact surface 94. In various embodiments, contact surface 92A, 92B may be configured for contacting a non-friction surface of another disk brake assembly component, for example, an adjacent disk leaf 512.

In various embodiments, non-contact surface 94 may extend radially at least partially between inner diameter surface 84 and outer diameter surface 86. In various embodiments, non-contact surface 94 extends circumferentially around at least a portion of disk leaf 512. In various embodiments, non-contact surface 94 extends circumferentially around the entirety of disk leaf 512 to form a complete annulus. According to various embodiments, the surface of the non-contact surface, may not be parallel to the contact surfaces of disk leaf 512 and, instead, may be oriented in any desired angle, and comprise a curve or any desired shape.

In various embodiments, each of at least two disk leaves 512 may comprise a circumferentially extending recess on an axial side of the disk leaf 512. In various embodiments, the at least two disk leaves 512 may be disposed in multi-leaved core 500 such that their recesses face each other, forming a cavity 510. In various embodiments, disk leaves 512 are in physical contact with each other at contact surfaces 92A, 92B, but do not form a continuous structure. While not intending to be bound by theory, in various embodiments, this structural discontinuity at contact surfaces 92A, 92B may serve to damp vibration. In various embodiments, cavity 510 limits the area of contact between disk leaves 512, which may also damp vibration and/or reduce brake noise of a disk brake assembly. According to various embodiments, improved braking performance under certain conditions and decreased variability in braking performance may be achieved. In various embodiments, multi-leaved core 500 may further comprise at least one spacer 520.

Figure 6:
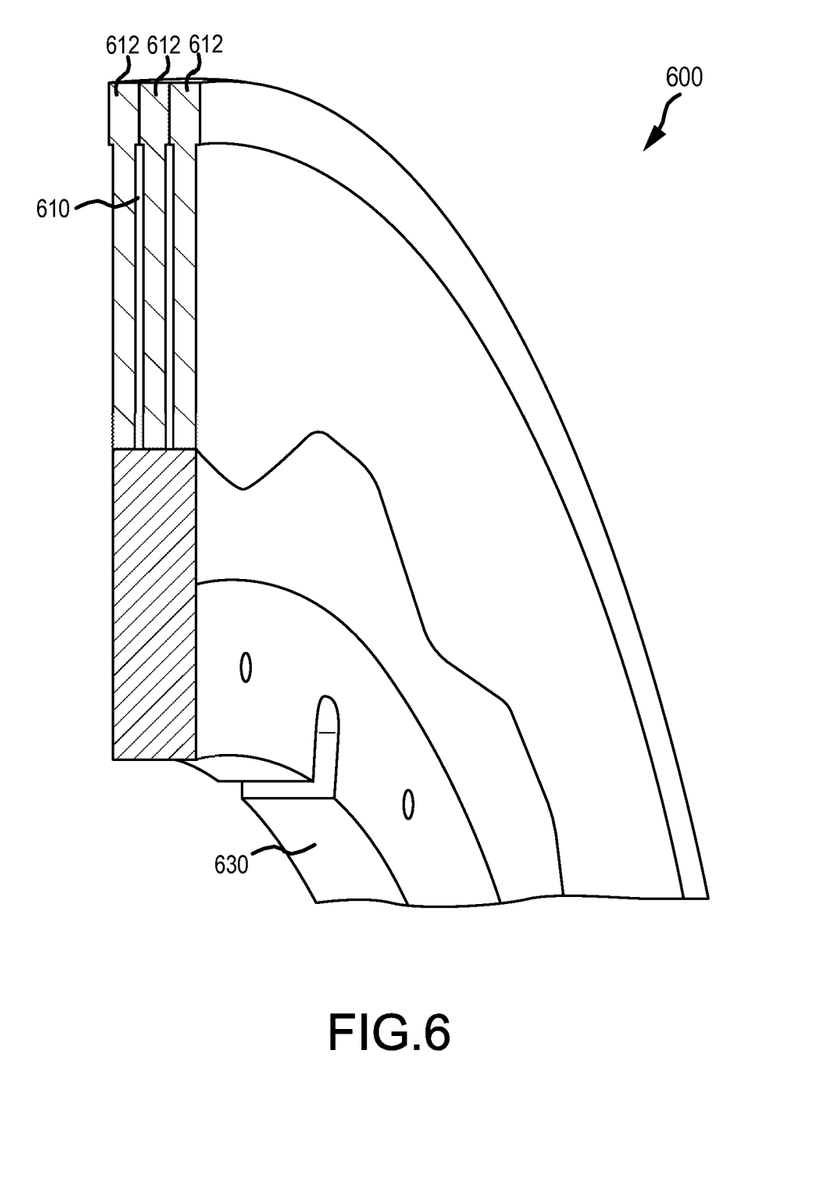
FIG. 6 illustrates a partial cut-away perspective view of a multi-leaved core in accordance with various embodiments.
Figure 7:
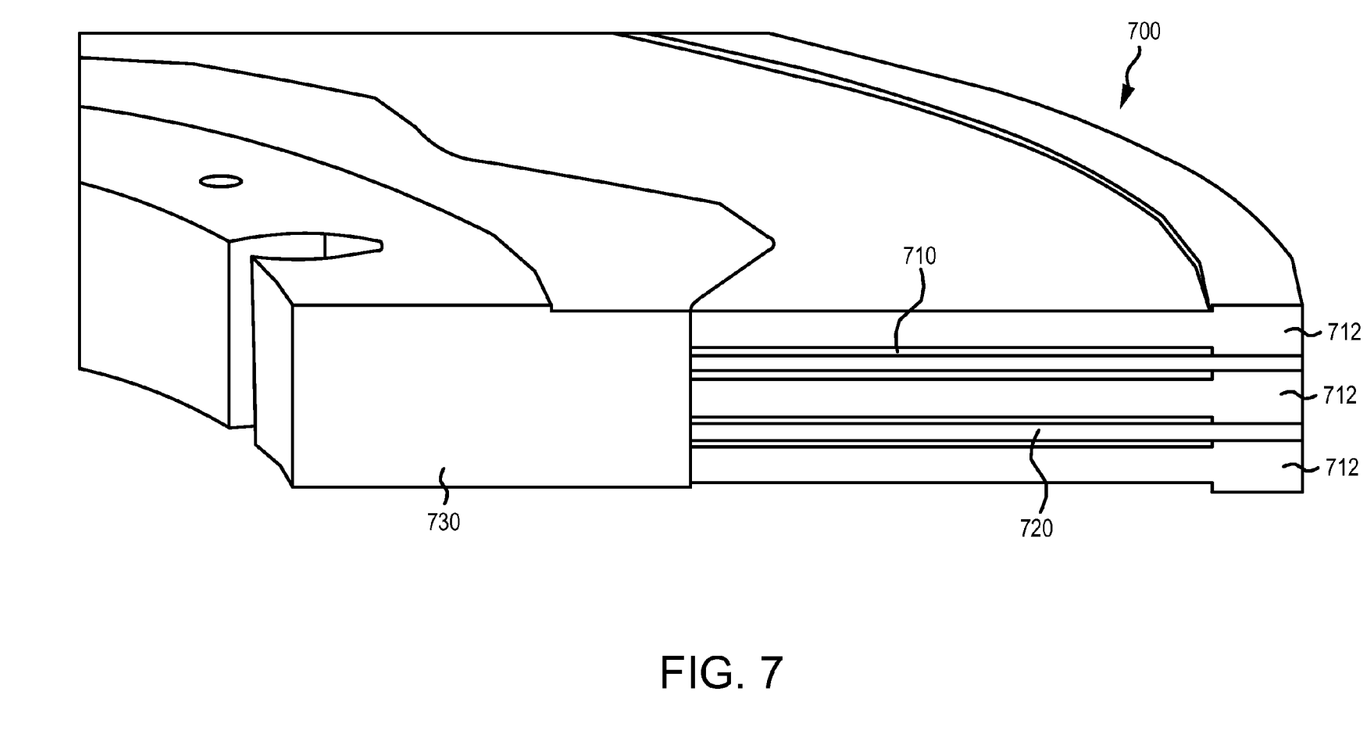
FIG. 7 illustrate an axial side view and cross-sectional views of a split friction disk half and disk assembly in accordance with various embodiments.

In various embodiments and with reference to FIG. 6, a multi-leaved core 600 may comprise a plurality of disk leaves 612, at least one cavity 610, and/or a floating core 630. In various embodiments and with reference to FIG. 7, a multi-leaved core 700 may comprise a plurality of disk leaves 712, at least one cavity 710, a floating core 730, and/or at least one spacer 720.

Solid friction disks may be referred to as "thick" or "thin" solid friction disks. In various embodiments, thick disks may be approximately twice as thick as thin disks. In general, a rotor (rotatable friction disk 42) comprises a thick friction disk while a stator (non-rotatable friction disk 40) comprises a thin friction disk; however, a rotor may comprise a thin friction disk while a stator may comprise a thick friction disk. As previously described, due to the high cost of the materials involved, such as the high cost of the carbon/carbon materials, reuse of materials may be important. For instance, thick friction disks may be used in the field within a braking system for a period of time, such as a first tour. A thick friction disk may be removed from service and then through machining be formed into a thin friction disk. This thin friction disk may be used in the field within a braking system for a period of time, such as a second tour. This thin friction disk may be removed from service and then through machining be formed into a split thick disk and/or half of a split thick disk. This thick split friction disk may be used in the field within a braking system for a period of time, such as a third tour. The thick split friction disk may be removed from service and through machining be formed into a thin split friction disk. This thin split friction disk may be used in the field within a braking system for a period of time, such as a fourth tour. Thus, in various embodiments, a disk brake assembly which uses a variety of thin and thick and solid and split friction disks may extend the life span of the friction disks as these parts may be reused in other brake system applications, as compared with an all split disk brake assembly which may be limited to one or two tours. In various embodiments, use of multi-leaved core damping disks and/or a single "dead" disk to provide damping may improve cost efficiencies through reuse and repurposing of friction disks and carbon composite materials.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A multi-leaved core damping disk comprising:
   a first disk half having a first friction surface at a first axial end of the first disk half and a first non-friction surface at a second axial end of the first disk half;
   a second disk half having a second friction surface at a third axial end of the second disk half and a second non-friction surface at a fourth axial end of the second disk half, wherein the first friction surface is disposed at a fifth axial end of the multi-leaved core damping disk and the second friction surface is disposed at a sixth axial end of the multi-leaved core damping disk; and
   a multi-leaved core disposed between, and axially aligned with, the first disk half and the second disk half, wherein the multi-leaved core comprises a plurality of disk leaves, including a first disk leaf and a second disk leaf, and a cavity is disposed between the first disk leaf and the second disk leaf.

2. The multi-leaved core damping disk of claim 1, wherein the first and second disk leaves comprise a carbon composite material.

3. The multi-leaved core damping disk of claim 1, wherein the first and second disk leaves comprise a refractory metal.

4. The multi-leaved core damping disk of claim 1, wherein at least one of the plurality of disk leaves comprises an axial thickness of between about 1.27 millimeters and about 15.24 millimeters.

5. The multi-leaved core damping disk of claim 1, wherein the multi-leaved core further comprises a plurality of spacers, wherein each one of the plurality of spacers is disposed alternately with each one of the plurality of disk leaves along an axis.

6. The multi-leaved core damping disk of claim 1, wherein at least one of the plurality of disk leaves comprises:
   a contact surface at an axial end of each one of the plurality of disk leaves; and
   a non-contact surface recessed from the contact surface.

7. The multi-leaved core damping disk of claim 1, wherein the multi-leaved core further comprises a floating core.

8. A disk brake assembly comprising:
   a pressure plate coupled to a first rotor friction disk of a plurality of rotor friction disks; and
   a plurality of stator friction disks located between the pressure plate and an end plate, wherein each one of the plurality of stator friction disks is disposed alternately with each one of the plurality of rotor friction disks along an axis, and wherein at least one of the plurality of rotor friction disks and the plurality of stator friction disks comprises a solid friction disk;
   wherein the end plate is coupled to a second rotor friction disk of the plurality of rotor friction disks;
   wherein at least one of the plurality of stator friction disks comprises a multi-leaved core damping disk;
   wherein the multi-leaved core damping disk comprises: a first disk half having a first friction surface at a first axial end of the first disk half and a first non-friction surface at a second axial end of the first disk half;
   a second disk half having a second friction surface at a third axial end of the second disk half and a second non-friction surface at a fourth axial end of the second disk half, wherein the first friction surface is disposed at a fifth axial end of the multi-leaved core damping disk and the second friction surface is disposed at a sixth axial end of the multi-leaved core damping disk; and
   a multi-leaved core disposed between, and axially aligned with, the first disk half and the second disk half, the multi-leaved core comprising a plurality of disk leaves, wherein a cavity is disposed between at least two adjacent disk leaves of the plurality of disk leaves.

9. The disk brake assembly of claim 8, wherein a friction disk position of the multi-leaved core damping disk is selected to damp vibration within the disk brake assembly.

10. The disk brake assembly of claim 8, wherein the multi-leaved core further comprises a plurality of spacers, wherein each one of the plurality of spacers is disposed alternately with each one of the plurality of disk leaves along an axis.

11. The disk brake assembly of claim 8, wherein at least one of the plurality of disk leaves comprises:
a contact surface at an axial end of the at least one of the plurality of disk leaves; and
a non-contact surface recessed from the contact surface.

12. The disk brake assembly of claim 8, wherein the multi-leaved core further comprises a floating core.

13. A disk brake assembly comprising:
a pressure plate coupled to a first rotor friction disk of a plurality of rotor friction disks; and
a plurality of stator friction disks located between the pressure plate and an end plate, wherein each one of the plurality of stator friction disks is disposed alternately with each one of the plurality of rotor friction disks along an axis, and wherein at least one of the plurality of rotor friction disks and the plurality of stator friction disks comprises a solid friction disk;
wherein the end plate is coupled to a second rotor friction disk of the plurality of rotor friction disks;
wherein at least one of the plurality of rotor friction disks comprises a multi-leaved core damping disk;
wherein the multi-leaved core damping disk comprises: a first disk half having a first friction surface at a first axial end of the first disk half and a first non-friction surface at a second axial end of the first disk half;
a second disk half having a second friction surface at a third axial end of the second disk half and a second non-friction surface at a fourth axial end of the second disk half, wherein the first friction surface is disposed at a fifth axial end of the multi-leaved core damping disk and the second friction surface is disposed at a sixth axial end of the multi-leaved core damping disk; and
a multi-leaved core disposed between, and axially aligned with, the first disk half and the second disk half, the multi-leaved core comprising a plurality of disk leaves, wherein a cavity is disposed between at least two adjacent disk leaves of the plurality of disk leaves.

14. The disk brake assembly of claim 13, wherein a friction disk position of the multi-leaved core damping disk is selected to damp vibration within the disk brake assembly.

15. The disk brake assembly of claim 13, wherein the multi-leaved core further comprises a plurality of spacers, wherein each one of the plurality of spacers is disposed alternately with each one of the plurality of disk leaves along an axis.

16. The disk brake assembly of claim 13, wherein at least one of the plurality of disk leaves comprises:
a contact surface at an axial end of the at least one of the plurality of disk leaves; and
a non-contact surface recessed from the contact surface.

17. The disk brake assembly of claim 13, wherein the multi-leaved core further comprises a floating core.

* * * * *